Figure 1:
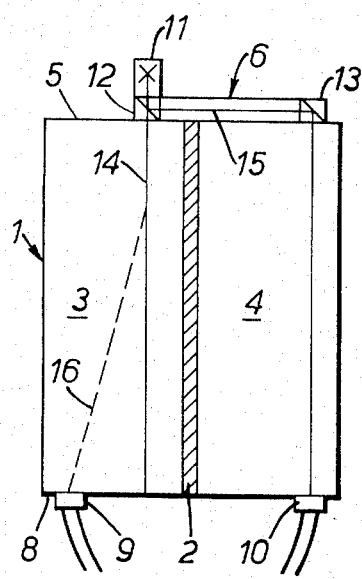

United States Patent [19]
Henning

[11] 3,809,912
[45] May 7, 1974

[54] LIGHT SCATTERING MEASUREMENT INSTRUMENT
[75] Inventor: Michael Laurence Henning, Shepton Mallet, England
[73] Assignee: Plessey Handel und Investments AG, Essex, England
[22] Filed: June 21, 1972
[21] Appl. No.: 265,017

[30] Foreign Application Priority Data
June 29, 1971   Great Britain.................. 30372/71

[52] U.S. Cl................. 250/574, 250/575, 356/104
[51] Int. Cl. ............................................. G01h 21/26
[58] Field of Search ............ 250/218; 356/103, 104, 356/204–208

[56] References Cited
UNITED STATES PATENTS
3,659,111   4/1972   Weaver et al...................... 250/225
3,532,434   10/1970  Jones, Jr. et al................. 250/218 X
3,659,946   5/1972   Kozawh .............................. 356/104
3,664,752   5/1972   Hermiev ............................. 356/206
3,677,652   7/1972   Little ................................ 250/218 X Primary Examiner—Walter Stolwein
Attorney, Agent, or Firm—Scrivener Parker Scrivener & Clarke

[57] ABSTRACT

An instrument for measuring light scattering coefficients in a fluid comprises a beam splitter which splits a lightbeam from a light source into two beams of different intensities, each beam passing through the fluid in separate chambers respectively, photocells are positioned in the chambers one being aligned with the beam of lowest intensity and the other out of alignment with the other beam so that it is only sensitive to scattered light. A second light source and beam splitter is also incorporated to enable the operative relationship of the photo cells. Also applicable to turbidimeters where light beams have different path lengths.

3 Claims, 2 Drawing Figures

LIGHT SCATTERING MEASUREMENT INSTRUMENT

This invention relates to measuring instruments that are particularly though not exclusively suited to the measurement of light scattering and light attentuation coefficients of fluids.

In measuring light scattering coefficients it is necessary to measure both the intensity of a light beam directly transmitted through the fluid and the intensity of light reflected or scattered from the light beam due to particles suspended in the fluid. When measuring instruments are used to monitor scattering coefficients over a considerable period of time, it is necessary to provide photo-responsive devices for measuring the intensity of the light beam in both direct and scattered modes, such devices having a wide dynamic range. This is due to the necessity of alternating each device between a direct and therefore high intensity mode and a scattered and therefore low intensity mode to enable errors due to fouling and deterioration of components of the instrument to be compensated for. Photoresponsive devices having sufficiently wide dynamic ranges are difficult to produce, expensive and unduly large. A similar problem arises in the measurement of light attenuation coefficients where two light beams are arranged to traverse significantly different path lengths. This invention seeks to enable photo sensitive devices to be used which do not have to have such a large dynamic range.

According to the present invention a system for measuring a characteristic or parameter appertaining to the effect of light radiation on a particular material or substance comprises a beam splitter, by means of which light from a light source is radiated to a pair of light sensitive detectors through two paths in which said substance is disposed having high and low resistance respectively to light radiation, one path to each detector, and comprising means for admitting more light to the path of high resistance than is admitted to the path of low resistance whereby the detectors receive light from the said source of substantially similar intensity.

The means for admitting more light to one path than the other may form a part of the beam splitter and may comprise for example a part silvered mirror which passes proportion of light from said source to one path and reflects the rest of the light to the other path.

The system lends itself more especially but not exclusively to the measurement of scattering coefficients as applied to liquids and in this case the matter disposed in the paths is a liquid the scattering coefficient of which it is desired to measure.

The path to which most light is admitted for the measurement of scattering coefficient is an indirect path whereby the detector associated with this path is indirectly illuminated with scattered light, whereas the path to which less light is admitted is a direct path along which light from the source is radiated directly on to the other detector.

Alternatively the system may be used to measure the attenuation coefficient of a liquid whereby the path to which more light is admitted is somewhat longer than the other of the two paths to which less light is admitted.

For the measurement of scattering coefficients, in order to cancel the effect of light source dimming through dirty optical equipment and reduced light source emission, two light sources, beam splitters and means for admitting more light to one path than the other path may be used the light sources being illuminated alternately and arranged so that each detector receives direct light from one source and scattered light from the other. Although not discussed in detail herein it will be appreciated by those skilled in the art that electrical signals produced corresponding to the light falling on a particular light sensitive detector may be utilised in conjunction with light signals derived from the other light sensitive detector to produce a signal characteristic of the optical scattering coefficient of a liquid under test or the light attenuation coefficient as the case may be.

It will also be appreciated that in the case of the measurement of optical scattering, coefficients wherein two light sources are utilised the advantageous cancelling effects mentioned will be afforded.

Figure 2:
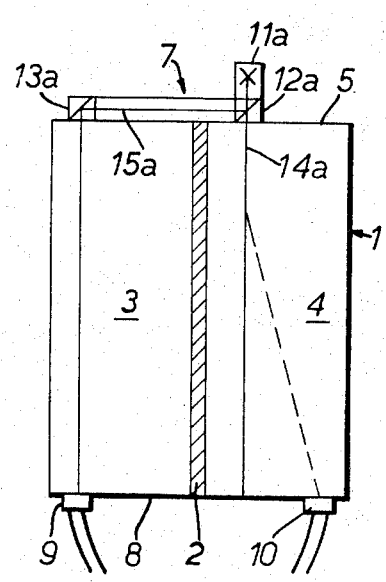

By way of example one specific embodiment of the present invention will be described with reference to the accompanying drawing, in which FIG. 1 is a somewhat diagrammatic cross-section through an instrument for measuring light scattering coefficients and showing a first light source, and FIG. 2 is a further cross-section of the instrument of FIG. 1 showing a second light source.

An instrument for measuring light scattering coefficients, such instruments being referred to as nephelometers, comprises a housing 1 which is divided by an internal wall 2 into two chambers 3 and 4. The chambers 3 and 4 are open ended to enable a fluid to flow through them. The housing has a top portion 5 on which is mounted first and second light sources and beam splitter assemblies 6 and 7 shown in FIGS. 1 and 2, respectively. Mounted on a bottom portion 8 of the housing are two photo cells 9 and 10, arranged one in each chamber. The photocells are connected to measuring means, in a manner well known to those skilled in the art, so that the intensity of any light falling on the photocells can be measured.

The first light source and beam splitter assembly 6 comprises a light source 11 and two prisms 12 and 13, the prism 12 being mounted below the light source 11 in the path of the light from the light source. The prism 12 is constructed to be partially reflective so that light from the light source is divided into two beams 14 and 15, the beam 14 being a direct beam through the prism into the chamber 3 and aimed at the bottom 8 of the housing 1. The second or indirect beam 15 is aimed at the prism 13 which directs the beam 15 into the chamber 4 and aims the beam directly at the photocell 10. The photocell in the chamber 3 is out of alignment with the beam 14 so that it will only detect scattered light. For this reason the intensity of the beam 14 is arranged to be greater than that of the beam 15, as only a small proportion of the light in the beam will reach the photocell 9. This enables two photocells having similar sensitivities to be used.

The second light source and beam splitter assembly 7 (FIG. 2) is similar to the above described first assembly 6, the only difference being in the position of the light beams with respect of the photocells 9 and 10 and in the following description similar features have the same reference numerals with the suffix $a$. The direct beam $14a$ from the light source $11a$ is directed into the chamber 4 but it is not in line with the photocell 10 and consequently photocell 10 detects only scattered light.

The indirect beam 15a is directed into the chamber 3 and is aimed directly at the photocell 9.

In operation of the instrument, for example in measuring scattering coefficients in flowing water. The nephelometer is immersed in the flowing water so that water passes through the chambers 3 and 4. To measure the scattering coefficient the light sources are alternately illuminated and light falling on the photocells measured. From these measurements it is possible to determine the amount of suspended solids in the flow of water by means well known to those skilled in the art.

It has been found from experiments from a wide variety of particles suspended in water flowing through the instrument that an optimum result is achieved if the mean angle of scattered light to the direct path of light (shown by the dotted line 16) is approximately 15°.

By the use of the two light sources and corresponding beam splitters inaccuracies in the measurement due to fouling of the mirrors and photocells are compensated for.

In an alternative form of instrument a single light source and beam splitter can be used by mounting it so that it can be rotated to alternately align the direct beam with the photocells in the two chambers. In other applications the instrument can be used in atmospheric studies where small particles are present.

By suitable alteration of the geometry of the beams in the chambers the principles of this invention can be applied to a turbidimeter, that is an instrument for measuring light attenuation coefficients. In this type of instrument the light beams in both chambers are aimed at the respective photocells but the light is arranged to traverse different path lengths in each chamber.

What we claim is:

1. A system of measuring a characteristic or parameter appertaining to the effect of light radiation on a particular material or substance comprising two light sensitive detectors, light producing and distribution means for feeding light to each detector either from one path of a first character to which light from the said distribution means is fed at one intensity or from another path of a second character which is more direct than the said one path and to which light is fed from said distribution means at another intensity somewhat lower than the said one intensity so that when one detector is fed from a path of the first character the other detector is fed from a path of the second character, the paths having disposed therealong the said particular material or substance, the detectors being fed repetitively from alternate paths thereby to produce electrical signals in dependence upon which the said characteristic or parameter is measured, and the lengths of the paths and the relative intensity of the light fed thereto being such that the detectors receive substantially similar intensities of light independently of the path via which they are fed, and wherein the said producing and distribution means comprises two light sources and two beam splitters one associated with each source, one of said sources and its associated beam splitter being arranged to feed light at said one intensity via a path of said first character to one of the two detectors and light at the somewhat lower intensity via a path of the said second character to the other of the two detectors and wherein the other of said sources and its associated beam splitter is arranged to feed light at said one intensity via a path of said first character to the other of the two detectors and light at the somewhat lower intensity via a path of said second character to the said one of the two detectors, the light sources being arranged to operate alternately.

2. A system as claimed in claim 1, wherein the path of the said first character is an indirect path for scattered light whereby measurement of scattering coefficient is facilitated.

3. A system as claimed in claim 1, wherein the path of the said first character is somewhat longer than the path of the second character whereby measurement of attenuation coefficient is facilitated.

* * * * *